Patented Oct. 4, 1932

1,880,965

UNITED STATES PATENT OFFICE

ELBERT C. LATHROP AND FERGUS A. IRVINE, OF CHICAGO, ILLINOIS, ASSIGNORS TO THE CELOTEX COMPANY, OF CHICAGO, ILLINOIS, A CORPORATION OF DELAWARE

FIBER PRODUCT PRESERVATION

No Drawing.   Application filed June 19, 1931.   Serial No. 545,490.

This invention relates to a new and improved treatment, its method of application, and the product thereof, whereby fibrous materials, particularly cellulosic fibers of vegetative origin, may be preserved and protected from attack of insects, fungi, and the like.

The invention is directed generally to a process or manner of introducing into fibrous products or depositing on fibers, arsenic in a relatively insoluble form, and especially to the application of the process to the preservation of fibrous products manufactured by sheeting, felting and the like, from fiber derived from vegetative sources and prepared for use by appropriate treating such as by digestion and mechanical refining, whereby it has been separated into fiber bundles and individual fibers. Arsenic in various forms has been more or less widely used in sprays and as dusting powders for protection against fungi, insects and the like, but such uses are of limited application in that they comprise merely a surface treatment with a relatively soluble form of arsenic. As opposed to prior practice this invention provides a means for and has as its particular object, the introduction integrally into materials in mass of a relatively insoluble form of arsenic. Not only does this invention disclose a simple method for the inclusion of arsenic integrally into materials of the nature mentioned, but the method of application is extremely simple and the cost both of the treatment and of the chemicals therefor is very low.

At the present time it is believed that the application of arsenic to the materials as is described in this application involves a combination of physical and chemical actions in obtaining the desired retention of arsenic in the material, but there is no clear line of demarcation and it is extremely difficult to determine whether there are involved only physical phenomena or only chemical phenomena, or whether there is involved a combination thereof. There are indications that in addition to the chemical actions involved in the application of the protective treatment as hereinafter described, adsorption plays a more or less prominent part; that is, it is believed probable that at least some of the retention of the chemicals in the product is due to adsorption of the chemicals by the fibers constituting the product.

In its broadest aspect, this invention relates to the method of affording protection to a fibrous product which is formed, sheeted, or otherwise produced from a fiber suspension wherein there is incorporated integrally into the finished product a material repellant or toxic to insects, fungi and the like, and in which the toxic material is incorporated into the finished product by its inclusion as a solid distributed through the material and deposited therein concurrently with the formation of such material. The toxic substance preferably incorporated as a slurry may include various water or fire proofing agents which may be thrown down on the fiber along with the insect and fungi repellent or toxic substances, all such substances hereafter referred to generally as proofing agents.

The objects of this invention are the provision of a process for the introduction of an insecticide and the like into a sheeted, felted or similarly formed fibrous product deposited from a suspension thereof, whereby such insecticide or the like is integrally incorporated throughout the body of the product; and to provide such a treatment which is simple in application, will provide the maximum of protection, will be applicable at a low cost, and which will have other and further advantages as will hereinafter be pointed out in the following specification.

Briefly, the invention relates to incorporation into the felted or sheeted product of a slurry containing the active agent, which slurry is added to the fiber suspension just prior to the formation of the fiber into the sheeted or felted product; that is, the proofing agent is added preferably subsequent to the various steps of refining the fiber. By applying the active agent in the manner as just mentioned, very decided advantages are obtained, in that the slurry may be prepared outside of the system and introduced in very definite proportions as desired; and further, due to the fact that the material incorporated into the formed sheet does not have to pass through refining equipment and the like, a much better retention of the active agent in the product is obtained. One of the reasons that it is believed that the physical phenomenon plays a part in this process is due to the fact that when the active agent is added at a point where it passes through refining engines and the like, the retention of the active agent in the formed sheet is appreciably less than when such active agent is added closely adjacent the sheeting machine and is not acted on by a fiber refining engine or the like.

While in its broadest aspect the invention relates to the addition of the active material as a slurry, there are numerous manners in which such slurries may be formed, and it is to be understood that the invention comprehends the formation of the slurry in any desired manner. Several methods of forming the slurry will be hereafter set out, but it is to be understood that these various methods of formation of the slurry are directive and indicative only, to serve as examples, and that with these examples before him, one skilled in the art may readily make obvious substitutions therein and variations therefrom, such as the use of other but equivalent chemical compounds of the same or other bases, and that such examples will suggest other combinations which will form satisfactory slurries for the purposes deired.

A preferred slurry for the purposes of the invention may be prepared from arsenic trioxide as the primary element, which arsenic trioxide is dissolved in sodium hydroxide or other similar solvent to which, after the formation of a solution, there will be added papermakers' alum, whereupon on the addition of an appropriate amount of ammonium hydroxide or other substance producing free hydroxyl ions, such as other hydroxides, organic amines, and the like, there will be formed a precipitate which is the desired thick slurry to be used. The thick slurry formed as just stated is rather gelatinous and somewhat flocculent and consists probably of aluminum hydroxide together with a precipitate of the arsenite, which is probably some complex salt but which is relatively insoluble in water at ordinary temperatures. In place of using papermakers' alum for the formation of the gelatinous precipitate, there may be used salts of any of the metals the hydroxides of which are gelatinous precipitates or which form basic gelatinous salts, as for example copper, iron, zinc, nickel, manganese, and the like.

As an alternative, the arsenic trioxide may be dissolved with a small amount of sodium hydroxide and then with the proper adjustment of pH by the addition of calcium or sodium hydroxide, or the hydroxides of magnesium, strontium, and the like, and thereupon upon the addition of ferric chloride $Al_2So_4$, $ZnSo_4$, $CaSo_4$, etc., to this mixture, there will be thrown down the desired somewhat gelatinous precipitate forming a slurry having the desired characteristics.

The desired slurry may also be formed by adding to arsenic trioxide which has been dissolved with sodium hydroxide, sufficient lime either as the oxide or hydroxide, whereupon on the application of heat, the soluble sodium arsenite will be converted into an insoluble calcium arsenite which, while not particularly gelatinous, appears to be sufficiently so for the purposes desired, or at least has sufficient adhesion or is sufficiently adsorbed for certain applications.

Other methods of providing the toxic slurry are to incorporate a relatively insoluble compound of arsenic in a froth which may be fed into the pulp stream from which the final product is felted, or by the formation of an emulsion of a relatively insoluble compound of arsenic which may likewise be fed into the stock.

The chemicals preferably used in the preparation of the preferred form of slurry comprise approximately 15 grams of papermakers' alum, 9 grams of arsenic trioxide and 5.4 grams of sodium hydroxide. The slurry is prepared by dissolving the alum in water and separately dissolving the arsenic trioxide with about one-half of the sodium hydroxide. The dissolved alum is heated and the sodium arsenite is added thereto, after which the balance of the sodium hydroxide is added, whereupon there is formed a thick gelatinous precipitate which is substantially insoluble and is probably a complex alum arsenical. With the proportions of the chemicals as stated, the hydrogen ion concentration at which the precipitate forms is approximately pH 6.7, but it is to be understood that the precipitation may be obtained through a reasonably wide range of pH; that is, by proper adjustment the precipitate may be obtained between from about pH 4.7 to pH 9.5.

In the use of the arsenic trioxide ferric chloride mixture, the arsenic trioxide is first dissolved wth sodium hydroxide, whereupon if the pH adjustment is correct, there will be precipitated a heavy gelatinous precipitate upon the addition of ferric chloride. The proportions of chemicals used in this reaction are approximately 1.2 parts of arsenic trioxide, 1.4 parts of sodium hydroxide, and 2 parts of ferric chloride, which in combination will have a pH of about 6.9, at which point the desired precipitate is readily obtained.

In employing the calcium arsenite form of treatment, the procedure is approximately as follows: Calcium oxide or quick-lime is slacked with an appropriate amount of water so that the milk of lime formed contains approximately 206 grams of calcium oxide per liter, which concentration corresponds to a specific gravity of approximately 20° Bé. at 15° C. To 15 kilograms of arsenic trioxide in about 62 liters of boiling water, there are added 12.75 kilograms of calcium oxide or 62 liters of the described milk of lime, and 62 liters of water. The calcium in the milk of lime will react with the arsenic and there will be precipitated a slurry comprising a relatively insoluble calcium arsenite which constitutes the slurry which is fed into the fiber stock.

For the formation of the slurry as a froth carrying the toxic material, a foam or froth may be prepared in any well known manner, into which froth the toxic material is incorporated. The froth may comprise xanthates, saponin, casein, or other frothing agent prepared as is well understood, and stabilized to any desired extent, depending of course somewhat on the specific manner in which it is to be used.

In preparing a slurry as an emulsion, arsenic trioxide or other suitable solid toxic agent may be suitably dispersed and formed into an emulsion with approximately 20% of bentonite or with a suitable amount of other emulsifying agent, and if desired or necessary such emulsion may be stabilized as is well known.

Of course, in connection with the several above described methods of preparation of the desired slurry, it is to be understood that toxic agents other than arsenic trioxide may be used; that is for example, antimony or bismuth compounds provide sufficient toxicity for certain purposes and behave substantially in the same manner as does arsenic, and they may be substituted for the arsenic which is described, if suitable modification of the procedure is made as will be readily understood by any skilled chemist.

In the various methods of preparation of the slurry wherein the precipitation depends upon hydrogen ion concentration, it is of course understood that the desired precipitation may be obtained at various pH's between the limits as previously stated, and that the best pH for the precipitation will depend upon the exact proportions of the chemicals used, which of course may be varied within reasonable limits in order that the precipitation may be obtained at some particular desired pH value.

The slurries as above described are incorporated into the finished product by addition in a relatively concentrated form into the prepared fibrous pulp which is to be formed into the finished product. The fibrous pulp is ordinarily fed into the forming, sheeting or felting machine as a quite thin fiber suspension ordinarily in the neighborhood of a ½% suspension of fiber. The slurry in definite measured amounts, depending upon the amount which it is desired shall be incorporated into the finished product, is preferably fed into the fiber suspension closely adjacent the forming or felting machine, whereupon when the suspending fluid is drained from the fibrous material through the screen on which the product is formed, the toxic material supplied in the slurry is retained in the fibrous mat formed to provide the desired protection against insects, fungi, and the like.

While this invention has been particularly described only for the incorporation into the finished product of an insect or fungi toxic material, the process is directly applicable to the introduction of fire-proofing salts or waterproofing materials; that is, slurries of suitable fireproofing salts or waterproofing substances may be prepared and fed into the fluid suspension of the fibrous material to be suitably incorporated into the finished felted or formed product as described in connection with the insect or fungi proofing treatment described specifically herein.

The word "slurry" in this application has been employed in a broad sense, that is, as a word descriptive of a procedure wherein a substance is initially dispersed, suspended, or the like, in a relatively small amount of liquid whereby it may subsequently be readily incorporated with substantial uniformity throughout a much greater body of liquid. While the word "slurry" is at times—and properly so—used to describe the condition of relatively high concentration of fiber suspension, it is not so used herein, since so far as the fiber is concerned there is involved only fiber suspensions of low concentration, that is, containing only about 1% fiber or less, and the word "slurry" herein is used only in connection with and as descriptive of conditions in connection with application to and treatment of fibers with the protective substances.

There having been described herein the method of proofing sheeted or felted fibrous materials against the attacks of insects and fungi, and there having been specifically described the methods of accomplishing the desired results, we claim 1. A fibrous product having integrally distributed therethrough an insect and fungi toxic substance initially formed as a slurry and subsequently distributed throughout the product in its process of manufacture, the slurry comprising a metalloid of the arsenic family thrown down as a complex with a metallic element producing gelatinous hydroxide or basic gelatinous salts and precipitated by an alkali which in water produces free hydroxyl ions.

2. A fibrous product having integrally distributed therethrough an insect and fungi toxic substance initially formed as a slurry and subsequently distributed throughout the product in its process of manufacture, the slurry comprising an arsenical salt precipitated with papermakers' alum by hydrogen ion adjustment through the addition of an alkali providing free hydroxyl ions in water solution.

3. A fibrous product having integrally distributed therethrough an insect and fungi toxic substance initially formed as a slurry and subsequently distributed throughout the product in its process of manufacture, the slurry comprising an emulsion of an arsenical salt stabilized insufficiently for maintenance of the emulsion on appreciable dilution.

4. The method of incorporating into fibrous masses a proofing agent wherein a proofing agent as an emulsion insufficiently stabilized to maintain its condition on appreciable dilution is distributed throughout the mass and wherein on distribution of the emulsion it is diluted to break the emulsion and thrown down on the fibrous material solids which were in suspension in the emulsion.

5. A fiber product having integrally distributed therethrough an insect and fungi toxic substance initially formed as a slurry and subsequently distributed throughout the product in its process of manufacture.

6. A fiber product having integrally distributed therethrough an insect and fungi toxic substance initially formed as a slurry and subsequently distributed throughout the product in its process of manufacture, the slurry comprising a soluble salt of arsenic precipitated with lime.

7. A fiber product having integrally distributed therethrough an insect and fungi toxic substance initially formed as a slurry and subsequently distributed throughout the product in its process of manufacture, the slurry comprising a substantially insoluble salt of arsenic in finely divided condition incorporated in a froth.

8. A fiber product having integrally distributed therethrough an insect and fungi toxic substance initially formed as a slurry and subsequently distributed throughout the product in its process of manufacture, the slurry comprising a substantially insoluble salt containing arsenic precipitated from a solution containing arsenic through interaction with a halide of iron on appropriate adjustment of hydroxyl ion concentration.

9. The method of incorporating into a fibrous product a toxic proofing agent, comprising the formation of a slurry of the proofing agent outside the fiber system with subsequent introduction and distribution thereof throughout the fiber suspension from which the fibrous product is formed, the incorporation of the proofing agent occurring just prior to formation of the fibrous product.

10. The method of incorporating into a fibrous product a toxic proofing agent, comprising the formation of a mixture of a proofing agent with a liquid in which it is substantially insoluble, with subsequent introduction into and distribution of said mixture in the fiber suspension from which the fibrous product is formed and finally the fiber of the fiber suspension together with the proofing agent formed into the fiber product.

11. The method of integrally incorporating a toxic proofing agent into a fibrous product formed on a screen from dilute fiber suspension, comprising as separate systems the formation of the mixture of the proofing agent with a liquid in which it is substantially insoluble and of a fiber suspension, said mixture incorporating the proofing agent subsequently fed into the fiber suspension closely adjacent the point of formation of the product.

12. In the production of a fibrous felted product the steps in the manufacture thereof comprising the formation of a suspension of the fiber, the separate formation of a slurry containing substantially water insoluble substances toxic to insects and fungi, and the addition of the slurry to the fiber suspension subsequent to its formation but just prior to formation of the felted product therefrom.

13. In the process of the production of a fibrous product from a fluid suspension and having incorporated therein insect and fungi toxic substances, the step comprising the incorporation of a toxic substance into a small amount of liquid to form a slurry, with subsequent distribution of the slurry throughout the large amount of liquid in which the fiber is suspended, the distribution of the small amount of liquid carrying the toxic substance occurring just prior to the formation of the fibrous product from the liquid suspension of fiber.

14. The method of incorporating into a fibrous product a toxic proofing agent whereing the proofing agent is prepared as a fluid mixture of relatively fine particles of the proofing agent outside the fiber suspension system, is fed into the fiber suspension subsequent to the substantial fiber refining operations but prior to actual formation of a felted product from the fiber of the suspension.

In testimony whereof, we have signed our names to this specification as of the 15th day of June, A. D. 1931.

ELBERT C. LATHROP.
FERGUS A. IRVINE.